United States Patent
Kasower

(10) Patent No.: US 8,060,424 B2
(45) Date of Patent: Nov. 15, 2011

(54) ON-LINE METHOD AND SYSTEM FOR MONITORING AND REPORTING UNUSED AVAILABLE CREDIT

(75) Inventor: Sheldon Kasower, Canoga Park, CA (US)

(73) Assignee: ConsumerInfo.com, Inc., Irvine, CA (US)

( * ) Notice: Subject to any disclaimer, the term of this patent is extended or adjusted under 35 U.S.C. 154(b) by 525 days.

(21) Appl. No.: 12/265,249

(22) Filed: Nov. 5, 2008

(65) Prior Publication Data

US 2010/0114747 A1   May 6, 2010

(51) Int. Cl.
*G06Q 40/00* (2006.01)
(52) U.S. Cl. .......................... 705/35; 705/36 R; 705/38
(58) Field of Classification Search ............... 705/35–38
See application file for complete search history.

(56) References Cited

U.S. PATENT DOCUMENTS

| | | | |
|---|---|---|---|
| 5,590,038 A | 12/1996 | Pitroda | |
| 5,640,577 A | 6/1997 | Scharmer | |
| 5,844,218 A | 12/1998 | Kawan et al. | |
| 5,956,693 A | 9/1999 | Geerlings | |
| 5,990,038 A | 11/1999 | Suga et al. | |
| 6,038,551 A | 3/2000 | Barlow et al. | |
| 6,311,169 B2 | 10/2001 | Duhon | |
| 6,804,346 B1 | 10/2004 | Mewhinney | |
| 6,910,624 B1 | 6/2005 | Natsuno | |
| 6,985,887 B1 | 1/2006 | Sunstein et al. | |
| 7,028,052 B2 | 4/2006 | Chapman et al. | |
| 7,072,909 B2 | 7/2006 | Polk | |
| 7,281,652 B2 | 10/2007 | Foss | |
| 7,330,835 B2 | 2/2008 | Deggendorf | |
| 7,386,511 B2 | 6/2008 | Buchanan et al. | |
| 7,451,113 B1 | 11/2008 | Kasower | |
| 7,529,698 B2 | 5/2009 | Joao | |
| 7,647,274 B2 | 1/2010 | Peterson et al. | |

(Continued)

FOREIGN PATENT DOCUMENTS

WO    WO 01/84281    11/2001

OTHER PUBLICATIONS

"Consumers Gain Immediate and Full Access to Credit Score Used by Majority of U.S. Lenders." Mar. 19, 2001, p. 1, PR Newswire, ProQuest copy.

(Continued)

*Primary Examiner* — Lindsay M MaGuire
*Assistant Examiner* — Hao Fu
(74) *Attorney, Agent, or Firm* — Knobbe, Martens, Olson & Bear LLP

(57) ABSTRACT

The present invention generally relates to monitoring and advising consumers of their outstanding credit balance by category of debt (i.e. including, but not limited to, the category of all credit cards, all real estate loans, all automotive loans, all revolving credit loans, etc.) and all minimum payments due by category of debt, and more particularly to an on-line method and system for monitoring and reporting total credit used by category of debt, total minimum payments due by category of debt and total unused available credit by category of debt, and alerting the consumer on a periodic basis via email. Since the credit report is the basis of most credit scores this invention is meant to provide the consumer with debt categories that are used in calculating their credit score, which is critical to future borrowing especially when the borrowing is approved or disapproved based only on the user's credit score.

16 Claims, 8 Drawing Sheets

---

UNUSED AVAILABLE CREDIT INFORMATION SUMMARY:

Total Credit Card Debt:
Existing Credit Card Debt Total: $14,346
Minimum Payment Due: $140.87
Unused Available Credit: $5,678

Total Mortgage Debt:
Existing Mortgage Debt Total: $678,456
Minimum Payment Due: $1675.43
Unused Available Credit: N/A
Equity Available: N/A Total Auto Loan Debt:
Existing Auto Loan Debt Total: $78,456
Minimum Payment Due: $475.43
Unused Available Credit: N/A Total Other Debt:
Existing Other Debt Total: $73,646
Minimum Payment Due: $190.18
Unused Available Credit: N/A Click here if you would like an appraisal of your property to see how much equity you have.

If you fill in your income in this line we will provide your current financial situation.

U.S. PATENT DOCUMENTS

| | | |
|---|---|---|
| 7,689,505 B2 | 3/2010 | Kasower |
| 2002/0069122 A1 | 6/2002 | Yun et al. |
| 2002/0077964 A1 | 6/2002 | Brody et al. |
| 2002/0128962 A1 | 9/2002 | Kasower |
| 2002/0169747 A1 | 11/2002 | Chapman et al. |
| 2002/0194120 A1 | 12/2002 | Russell et al. |
| 2003/0009415 A1 | 1/2003 | Lutnick et al. |
| 2003/0009418 A1 | 1/2003 | Green et al. |
| 2003/0097342 A1 | 5/2003 | Whittingtom |
| 2004/0044563 A1 | 3/2004 | Stein |
| 2004/0111359 A1 | 6/2004 | Hudock |
| 2004/0177035 A1 | 9/2004 | Silva |
| 2004/0236688 A1 | 11/2004 | Bozeman |
| 2006/0106670 A1 | 5/2006 | Cai et al. |
| 2007/0112668 A1 | 5/2007 | Celano et al. |
| 2007/0226047 A1 | 9/2007 | Ward |
| 2007/0262140 A1 | 11/2007 | Long, Sr. |
| 2008/0059352 A1 | 3/2008 | Chandran |
| 2008/0091519 A1 | 4/2008 | Foss |
| 2008/0221972 A1 | 9/2008 | Megdal |
| 2008/0222027 A1 | 9/2008 | Megdal et al. |
| 2008/0235063 A1 | 9/2008 | Kasower |
| 2008/0255980 A1 | 10/2008 | Kasower |
| 2008/0270209 A1 | 10/2008 | Mauseth et al. |
| 2008/0294501 A1 | 11/2008 | Rennich et al. |
| 2009/0024484 A1 * | 1/2009 | Walker et al. .................. 705/14 |
| 2009/0248573 A1 | 10/2009 | Haggerty et al. |
| 2010/0023448 A1 | 1/2010 | Eze |

OTHER PUBLICATIONS

Co-Pending U.S. Appl. No. 10/724,315, filed Nov. 26, 2003.
Co-Pending U.S. Appl. No. 10/665,244, filed Sep. 20, 2003.
Ettorre, Paul Kahn on Exceptional Marketing. Management Review, vol. 38(11), Nov. 1994, pp. 48-51.
Ideon, Credit-Card Registry That Bellyflopped this Year, Is Drawing some Bottom-Fishers, The Wall Street Journal, Aug. 21, 1995, p. C2.

\* cited by examiner

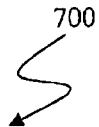

UNUSED AVAILABLE CREDIT INFORMATION SUMMARY:

Total Credit Card Debt:
Existing Credit Card Debt Total: $14,346
Minimum Payment Due: $140.87
Unused Available Credit: $5,678

Total Mortgage Debt:
Existing Mortgage Debt Total: $678,456
Minimum Payment Due: $1675.43
Unused Available Credit: N/A
Equity Available: N/A Total Auto Loan Debt:
Existing Auto Loan Debt Total: $78,456
Minimum Payment Due: $475.43
Unused Available Credit: N/A Total Other Debt:
Existing Other Debt Total: $73,646
Minimum Payment Due: $190.18
Unused Available Credit: N/A Click here if you would like an appraisal of your property to see how much equity you have.

If you fill in your income in this line we will provide your current financial situation.

FIGURE 7

ID_METHOD AND SYSTEM FOR MONITORING AND REPORTING UNUSED AVAILABLE CREDIT

ON-LINE METHOD AND SYSTEM FOR MONITORING AND REPORTING UNUSED AVAILABLE CREDIT

FIELD

The present invention generally relates to monitoring and advising consumers of their outstanding credit balance by category of debt, and more particularly to an on-line method and system for monitoring and reporting unused available credit by category of debt.

BACKGROUND

Traditionally the typical method for obtaining one's credit information was to request a credit report from a credit reporting bureau through various sources, and provide identifying proof of identity. However, credit reports do not analyze, calculate, summarize and compile the total debts owed for each debt category, the total amount of unused available credit for each debt category and the total minimum payments due for a given time period for each debt category. Also, determining and compiling these amounts manually is a time consuming process that requires an individual to obtain an amount from each particular credit grantor, for example an amount from each credit card company, mortgage lender, etc. To monitor changes in the amounts of unused available credit manually as reported to a credit bureau requires an individual to periodically purchase additional credit reports and manually determine the amounts of unused available credit for each subsequent credit report or contact each credit grantor individually. Moreover, the content within the credit report can be difficult to understand as it is not summarized and thus is not in the most presentable format for an individual to quickly understand the amount of unused credit that is available. Nor is a credit report provided automatically on a periodic basis such as a bank account or even credit card statements, thus not keeping the consumer informed of total credit debts owed by debt category or amounts available by debt category.

SUMMARY

This application describes an on-line method and system for monitoring, reporting and summarizing the amount of unused available credit for each debt category. The method and system also monitors, reports and summarizes the total debt associated with each debt category as reported to the credit bureau, and the minimum payments due for a given time period for each debt category, as reported to the credit bureau. The total amount of unused credit available for each debt category, the total debt associated with each debt category, and the minimum payment due for a given time period for each debt category is reported in a single communication so that the user can more easily determine his or her financial needs and requirements, and how this information can potentially affect the user's credit score.

In one embodiment, a method for on-line monitoring, reporting and summarizing an amount of unused available credit is provided. The method includes providing an on-line system that allows an end user to access the system by means of a computer. The method also includes the system requesting and retrieving credit information of the end user from a credit bureau. Further, the method includes the system presenting the unused credit available for each debt category, the total debt associated with each debt category and the minimum payments due for a given time period for each debt category to the end user in a summarized, easily readable and understandable format. The method and system also monitors, reports and summarizes the total debt associated with each debt category as reported to the credit bureau, and the minimum payments due for a given time period for each debt category, as reported to the credit bureau.

In another embodiment, an on-line system for monitoring, reporting and summarizing unused available credit information is provided. The system includes an enrollment component, a data request component, and a data presentation component. The enrollment component allows an end user to access the system by means of a computer. The data request component requests and retrieves credit information of the end user from a credit bureau. Also, the data presentation component presents a summary of the total debt owed for each debt category, the total amount of unused available credit for each debt category and the total minimum payments due for a given time period for each debt category in an easily readable and understandable format.

DESCRIPTION OF THE DRAWINGS

FIG. 7 is a screenshot of the unused available credit information provided in a summarized, easily readable and understandable format.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken In a limiting sense.

The embodiments presented herein are directed to an on-line method and system for monitoring and reporting unused available credit information to an individual. As described herein, the method and system for monitoring and reporting unused available credit provides the total amount of unused credit available for each debt category. The embodiments herein also provide the user with the total debts owed for each debt category and the total minimum payments due for a given time period for each debt category. Each debt category, as defined herein, may contain multiple credit lines. For example, a credit card debt category may include a number of different credit cards each from a different credit grantor. Examples of debt categories include, but are not limited to, credit cards, auto loans, home mortgages, term loans etc. As the credit report is the basis of most credit scores the embodiments herein are meant to provide the consumer with credit information grouped by debt categories that are used in calculating their credit score, which is critical to future borrowing, especially when the borrowing is approved or disapproved based only on the user's credit score.

Figure 1:
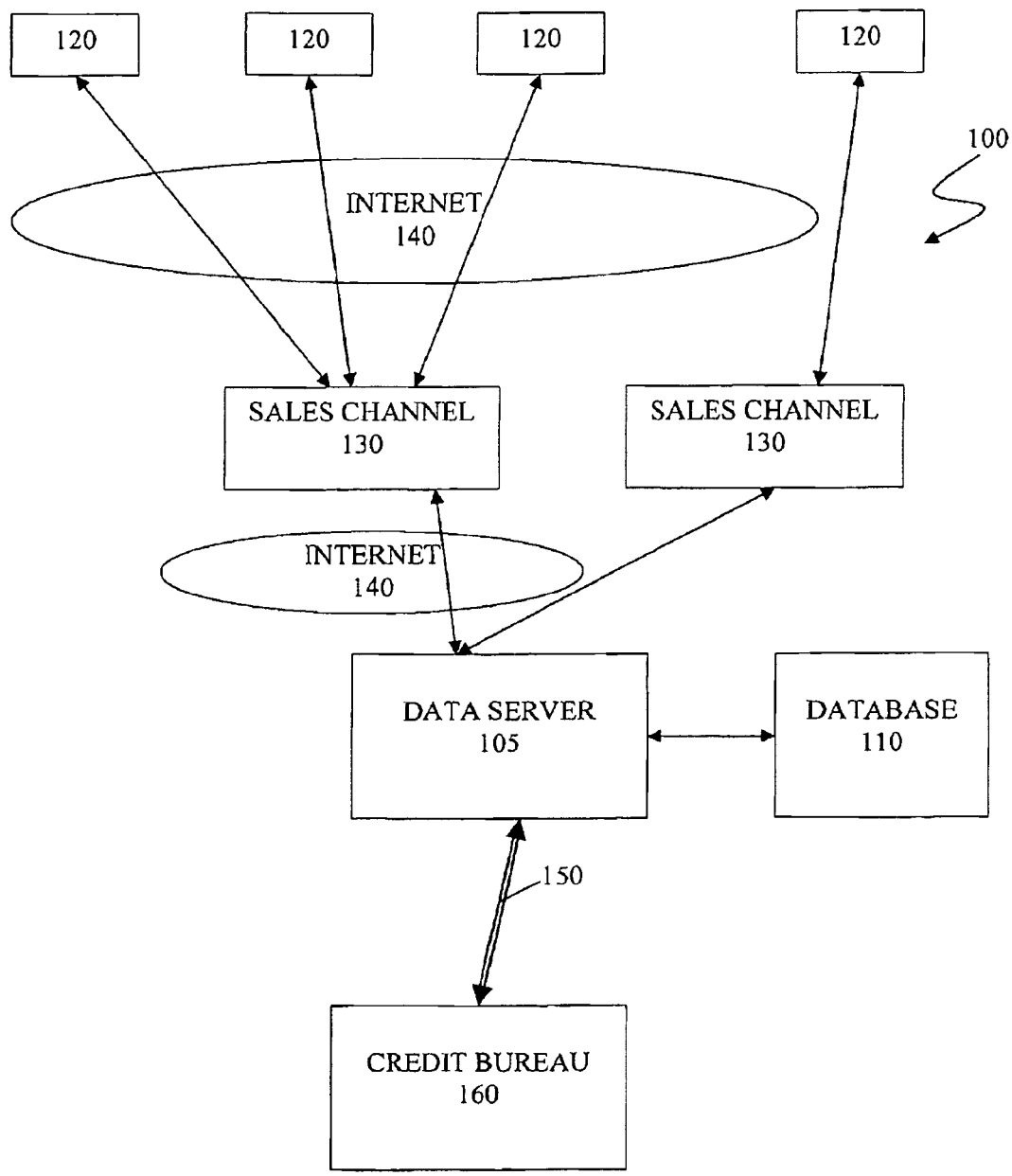
FIG. 1 is a high-level schematic of an implementation for providing an on-line method for monitoring and reporting the amount of unused available credit.

FIG. 1 is a high-level schematic of an implementation 100 for providing an on-line method for monitoring and reporting the amount of unused available credit. The implementation 100 includes a system 105 that is coupled to a database 110. The system 105 acts as the central location for monitoring and reporting the amount of unused available credit for individual end users. The database 110 stores end user information including personal identity data, end user credit information and end user customized settings. An end user, using one of the computers 120, accesses the system 105 by accessing one of the designated sales channels 130 via the Internet 140. In some embodiments, the sales channel 130 is run by the same entity that runs the system 105 and the sales channel 130 is directly coupled to the system 105. In other embodiments, the sales channel is run by a third party entity and is coupled to the system 105 via the Internet 140. The system 105 is also coupled to a credit bureau 160 via a secure data line 150. The implementation 100 allows the system 105 to act as a hub between end users and the credit bureau 160 in order to monitor and report unused credit information to the end user.

Figure 2:
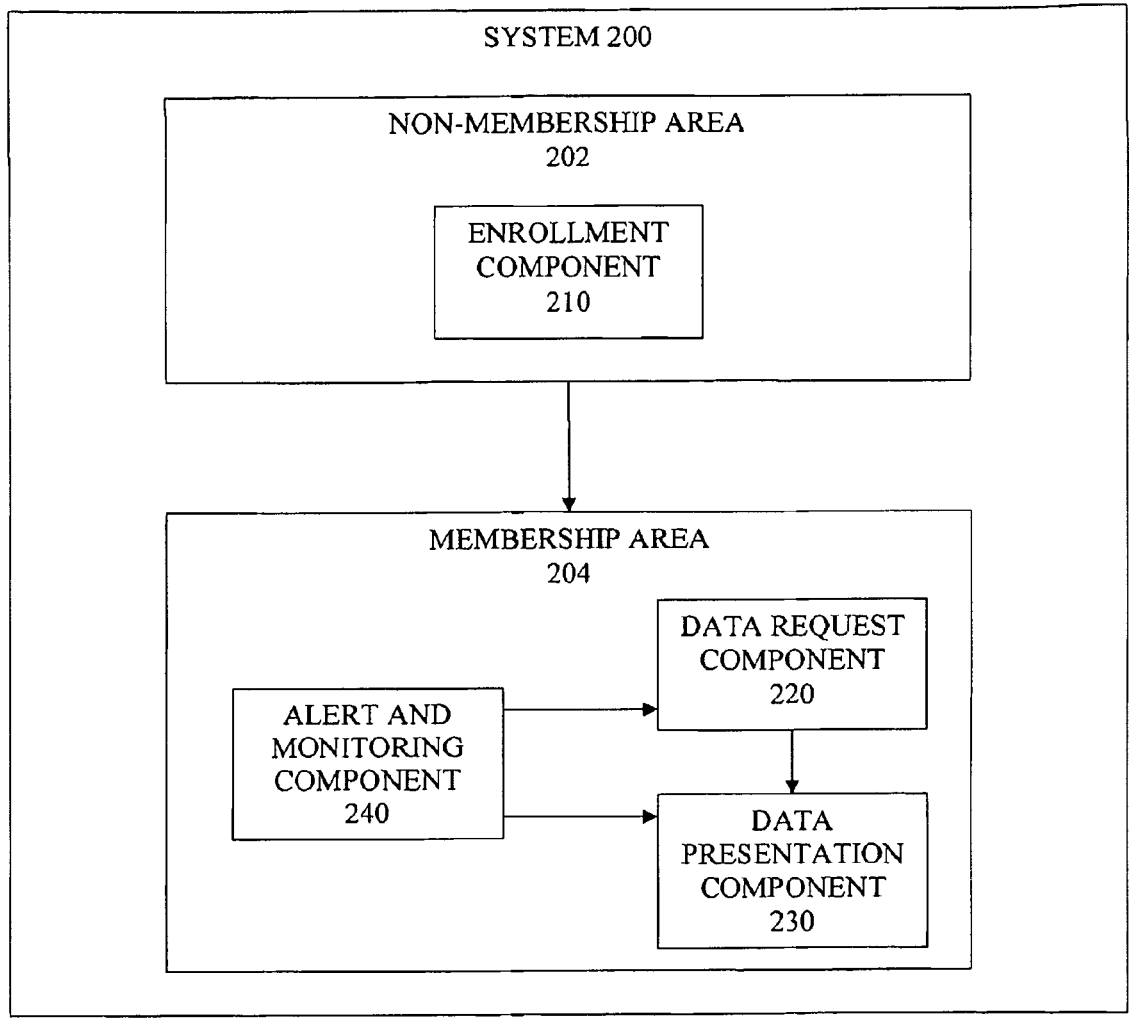
FIG. 2 is a block diagram of a system for providing an on-line method for monitoring and reporting the amount of unused available credit.

FIG. 2 is a block diagram of the system 105 for providing an on-line method for monitoring and reporting unused available credit information using the implementation 100. The system 105 includes a non-membership portion 202 and a membership portion 204. The non-membership portion 202 includes an enrollment component 210. The membership portion 204 includes a data request component 220, a data presentation component 230 and an alert and monitoring component 240. The enrollment component 210 of the non-membership portion 202 can be accessed by an end user at any time. However, the end user must complete the enrollment component 210 before the components within the membership portion 204 can be accessed.

The enrollment component 210 provides an enrollment process that allows an end user, accessing the system 105 by using the computer 120, to provide end user personal identity data to the system 105 and to grant the system 105 permission to request end user credit information from the credit bureau 160. Once the enrollment process is complete, the system 105 also grants the end user access to the components of the membership portion 204.

Figure 3:
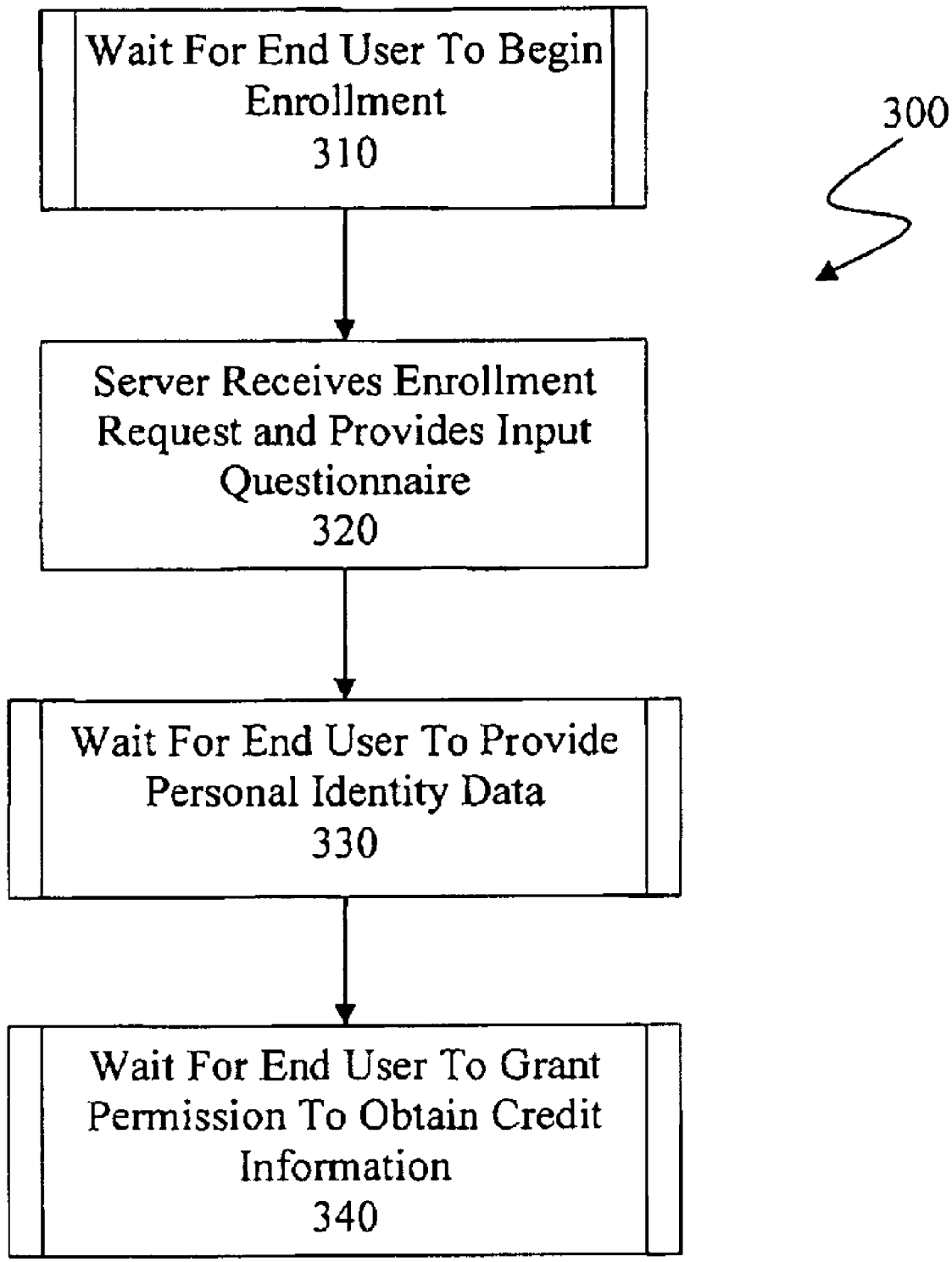
FIG. 3 is a flowchart of an enrollment process provided by the enrollment component.

FIG. 3 is a flowchart 300 of the enrollment process provided by the enrollment component 210. The flowchart 300 begins at step 310 where the system 105 waits for an end user to begin the enrollment process by accessing one of the designated sales channels 130 and requests enrollment to the system 105 to monitor and report the amount of unused credit available to the end user. The flowchart 300 then proceeds to step 320.

At step 320, the system 105 receives the request from the end user via the sales channel 130 and the system 105 provides an input questionnaire to the sales channel 130 to get necessary personal identity data from the end user. The personal identity data includes, for example, name, address, employment, social security number etc. The flowchart 300 then proceeds to step 330.

At step 330, the system 105, via the sales channel 130, provides the input questionnaire to the end user. The system 105 then waits for the end user, using the computer 120, to provide personal identity data in response to questions included in the input questionnaire. The flowchart 300 then proceeds to step 340.

At step 340, the system 105, via the sales channel 130, requests the end user to grant permission for the system 105 to request end user credit information from the credit bureau 160. Once permission is granted by the end user, the personal identity data is stored in the database 110. Once step 340 is completed, the end user can access the membership portion 204 and a data request process provided by the data request component 220 begins.

The data request component 220 provides the data request process whereby the system 105 submits personal identity data to the credit bureau 160 and requests end user credit information from the credit bureau 160.

Figure 4:
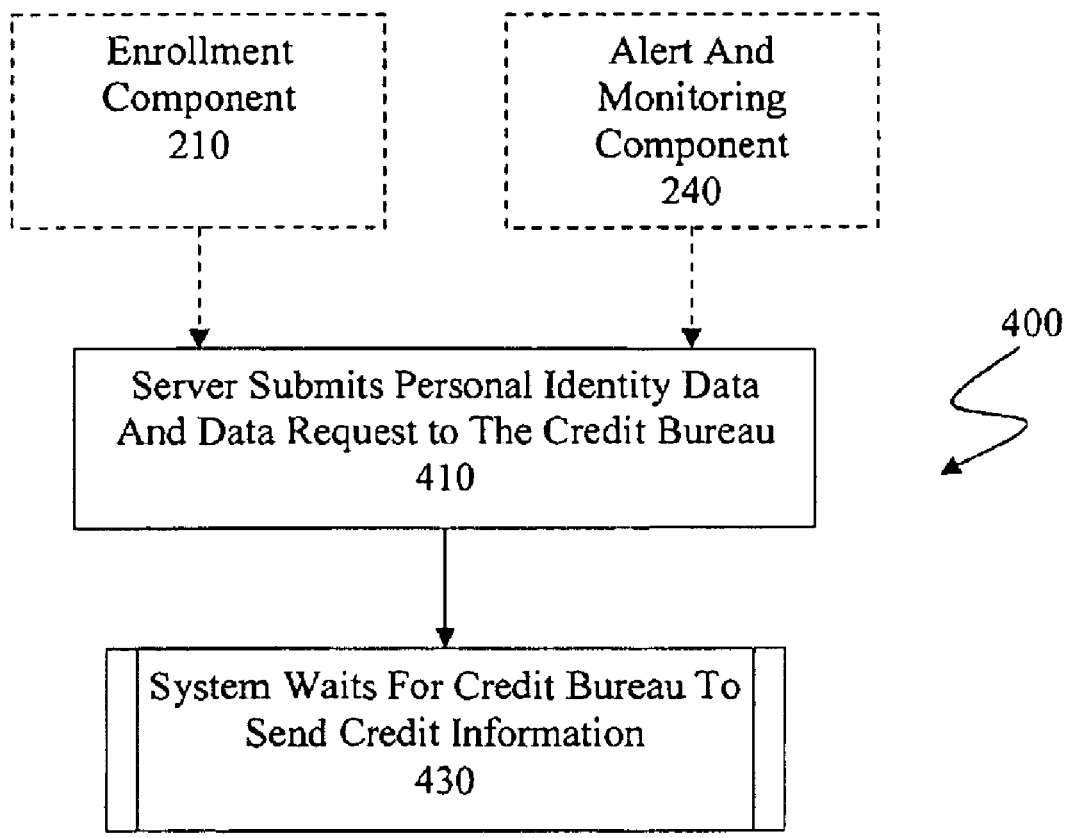
FIG. 4 is a flowchart of a data request process provided by the component.

FIG. 4 is a flowchart 400 of the data request process provided by the data request component 220. The flowchart 400 begins at step 410 where the system 105 submits the personal identity data and a data request on behalf of the end user to the credit bureau 160 via the secure data line 150. The data request submitted to the credit bureau 160 requests information that relates to the total debts owed for each debt category, the total amount of unused available credit for each debt category and the total minimum payments due for a given time period for each debt category. Accordingly, credit information includes, for example, information relating to the end user's: total amount of debt; revolving credit balances, limits and minimum monthly payments for each revolving credit balance; credit card balances, limits and minimum monthly payments for each credit card; mortgage and bank lines of credit balances, limits and minimum monthly payments for each mortgage or bank line; and other lines of credit balances, limits and minimum monthly payments for each other line of credit, etc., are requested in the data request. The data request is submitted to the credit bureau 160 after an end user completes the enrollment process provided by the enrollment component 210 and also periodically as determined by the alert and monitoring component 240. The flowchart 400 then proceeds to step 420. At step 420, the system 105 waits for the credit bureau 160 to send credit information, as per the data request. Once step 420 is completed, the data presentation process provided by the data presentation component 230 begins.

The data presentation component 230 provides the data presentation process whereby the system 105 receives and stores credit information from the credit bureau 160 in the database 110. Once the credit information is received, the system 105 presents the total amount of unused available credit for each debt category, the total debts owed for each debt category and the total minimum payments due for a given time period for each debt category to the end user in a summarized, easily readable and understandable format. In some embodiments, the credit information received from the credit bureau 160 does not include the total amount of unused credit available for each debt category, the total debts owed for each debt category and the total minimum payments due for a given time period for each debt category. In these embodiments, the system 105 reconfigures the credit information to provide the end user the total amount of unused credit available for each debt category, the total debts owed for each debt category and the total minimum payments due for a given time period for each debt category in a summarized, easily readable and understandable format. Reconfiguring the credit information includes grouping particular credit information for each credit line into its respective debt category (i.e. grouping all credit cards in a credit card debt category, grouping term loans in a term loan debt category, etc.), determining the total amount of debts owed for each debt category, determining the total credit limit allowed for each debt category and based on these amounts determining the total amount of unused available credit for each debt category. Reconfiguring the credit information further includes determining the total minimum payments due for a given time period for each debt category.

Figure 5:
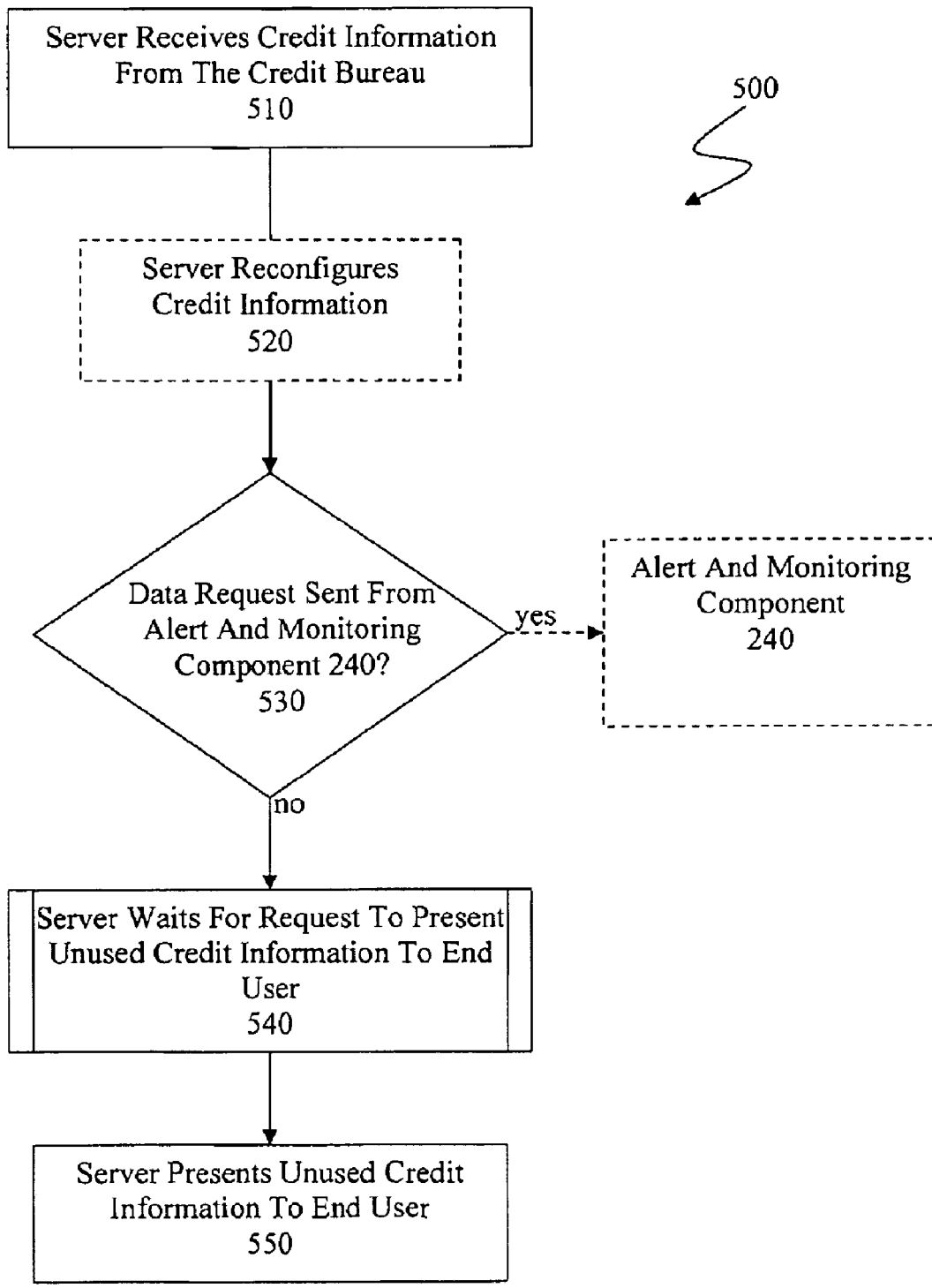
FIG. 5 is a flowchart of a data presentation process provided by the data presentation component.

FIG. 5 is a flowchart 500 of a data presentation process provided by the data presentation component 230. The flowchart 500 begins at step 510 where the system 105 receives end user credit information from the credit bureau 160 and stores the credit information in the database 110. In some embodiments, the credit information received from the credit bureau 160 does not include the total amount of unused credit available for each debt category, the total debts owed for each debt category and the total minimum payments due for a given time period for each debt category. In these embodiments, the flowchart 500 proceeds to step 520 before proceeding to step 530. In other embodiments where the credit information received from the credit bureau 160 does include the total amount of unused credit available for each debt category, the total debts owed for each debt category and the total minimum payments due for a given time period for each debt category, the flowchart 500 proceeds directly to step 530.

At step 520, the system 105 uses the credit information obtained from the credit bureau 160 and reconfigures the credit information into unused available credit information for presentation to the end user in a summarized, easily readable and understandable format. The system 105 also reconfigures the credit information to provide the end user the total debts owed for each debt category and the total minimum payments due for a given time period for each debt category. The flowchart 500 then proceeds to step 530.

At step 530, the system 105 determines whether the data request submitted at step 410 of the data request process was sent as a periodic update by the alert and monitoring component 240. If the data request was not sent as a periodic update by the alert and monitoring component 240, the flowchart proceeds to step 540. If the data request was sent as a periodic update by the alert and monitoring component 240, the flowchart proceeds to a monitoring and alert process of the alert and monitoring component 240.

At step 540, the system 105 waits for a request from the end user for a presentation of the unused available credit information. Once a request is received by the end user the flowchart 500 then proceeds to step 550.

At step 550, the system 105 presents the unused available credit information into a summarized, easily readable and understandable format for the end user. This includes providing the unused available credit information in a graphical or tabular presentation format. The system 105 also presents the total debts owed for each debt category and the total minimum payments due for a given time period for each debt category in a similar graphical or tabular presentation format. FIG. 7 is a screenshot 700 of the unused available credit information, the total debts owed for each debt category and the total minimum payments due for a given time period for each debt category that is provided in a summarized, easily readable and understandable format. As shown in FIG. 7, the screenshot 700 provides the end user the total debt for several debt categories including credit card debt, mortgage debt, auto loan debt and other credit debt. The screenshot 700 also provides the remaining unused available credit for each debt category and the minimum payment due for a given time period. The screenshot 700 also provides a hyperlink to access the system 105 in order to provide further personal identity data, in this case, the end user's income to provide the end user an analysis of the end user's current financial situation. Also, for the mortgage debt category, the system 105 can determine the current equity available.

The alert and monitoring component 240 provides custom settings to an end user to modify how the system 105 provides unused available credit information to the end user. These custom settings include setting periodic status updates and setting migration of credit balance alerts to the end user. Migration of credit balance, as defined herein, are any changes with an end user's outstanding balance, the available credit limit and the range between these values. The alert and monitoring component 240 configures the system 105, including the data request component 220 and the data presentation component 230, based on the custom settings determined by the end user and stores these settings in the database 110. Also, the alert and monitoring component 240 allows the system 105 to monitor the end user's amount of unused available credit and to send an alert and notify the end user of the amount of unused available credit based on the end user's configuration of the custom settings and to monitor the total debts owed for each debt category and the total minimum payments due for a given time period for each debt category. The alert and monitoring component 240 also allows an end user access to the system 105 at any time to monitor the end user's amount of unused available credit, the total debts owed for each debt category and the total minimum payments due for a given time period for each debt category. This information is presented based on the end user's configuration of the custom settings.

Figure 6:
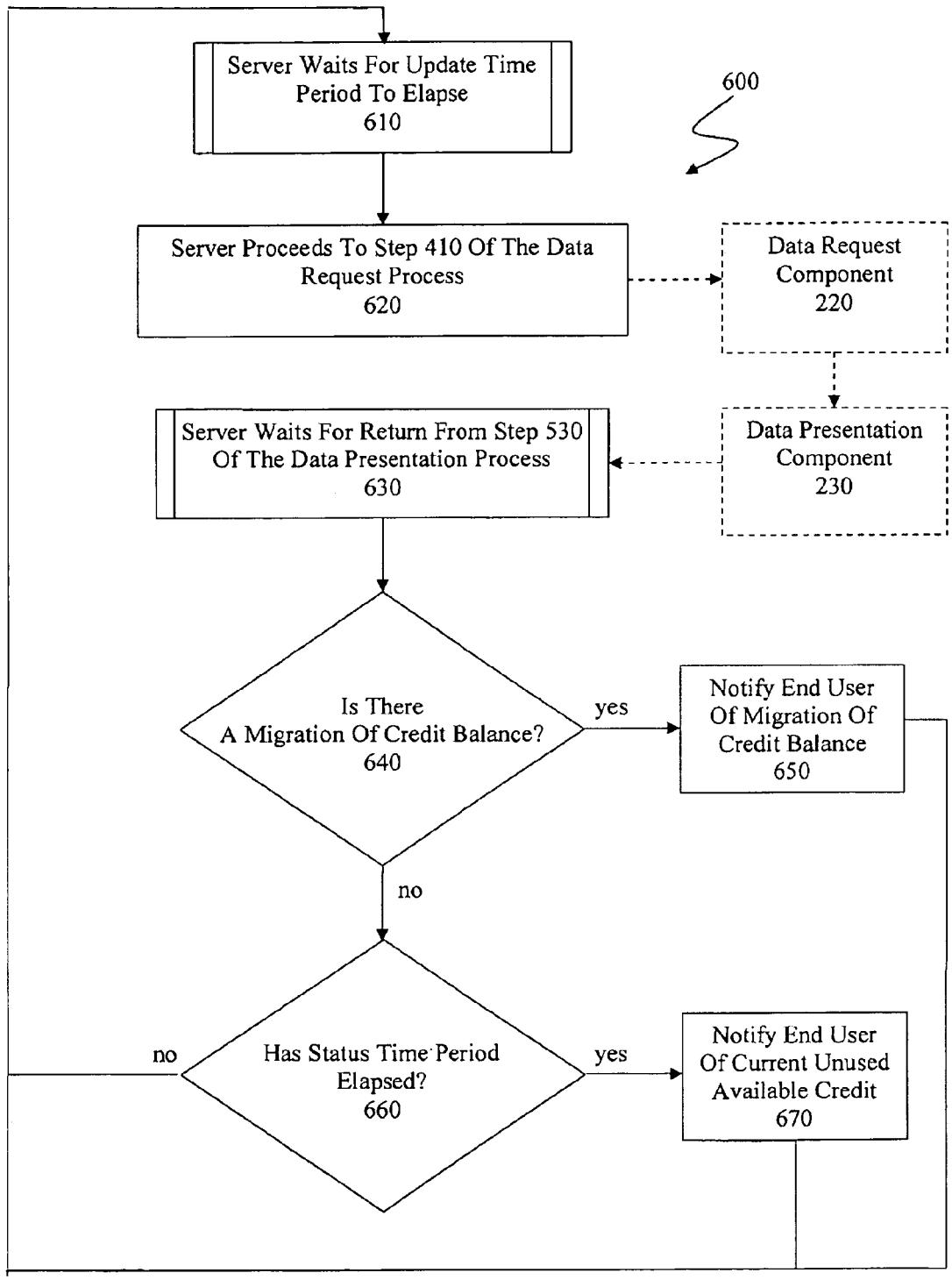
FIG. 6 is a flowchart of an alert and monitoring process provided by the alert and monitoring component.

The alert and monitoring component 214 provides a monitoring and alert process that provides an end user periodic status updates of the unused available credit information and provides an alert to the end user when there are any changes to the end user's unused available credit information. FIG. 6 is a flowchart 600 of the monitoring and alert process provided by the alert and monitoring component 240. The flowchart 600 begins at step 610 where the system 105 waits for an update time period to pass. The update time period is an amount of time between updating the database 110 with current end user credit information. The update time period is a custom setting that can be modified by the end user. When the periodic time period elapses, the flowchart 600 proceeds to step 620.

At step 620, the system 105 proceeds to step 410 of the data request process to send a data request to the credit bureau 160. The flowchart 620 then proceeds to step 630. At step 630, the system 105 waits until the system 105 returns from step 530 of the data presentation process. When the system 105 returns from step 530, the flowchart 600 proceeds to step 640.

At step 640, the system 105 determines whether there is any migration of credit balance. If the system 105 determines there is a migration of credit balance, the flowchart 600 proceeds to step 650. If the system 105 determines there is not a migration of credit balance, the flowchart 600 proceeds to step 660.

Figure 8:
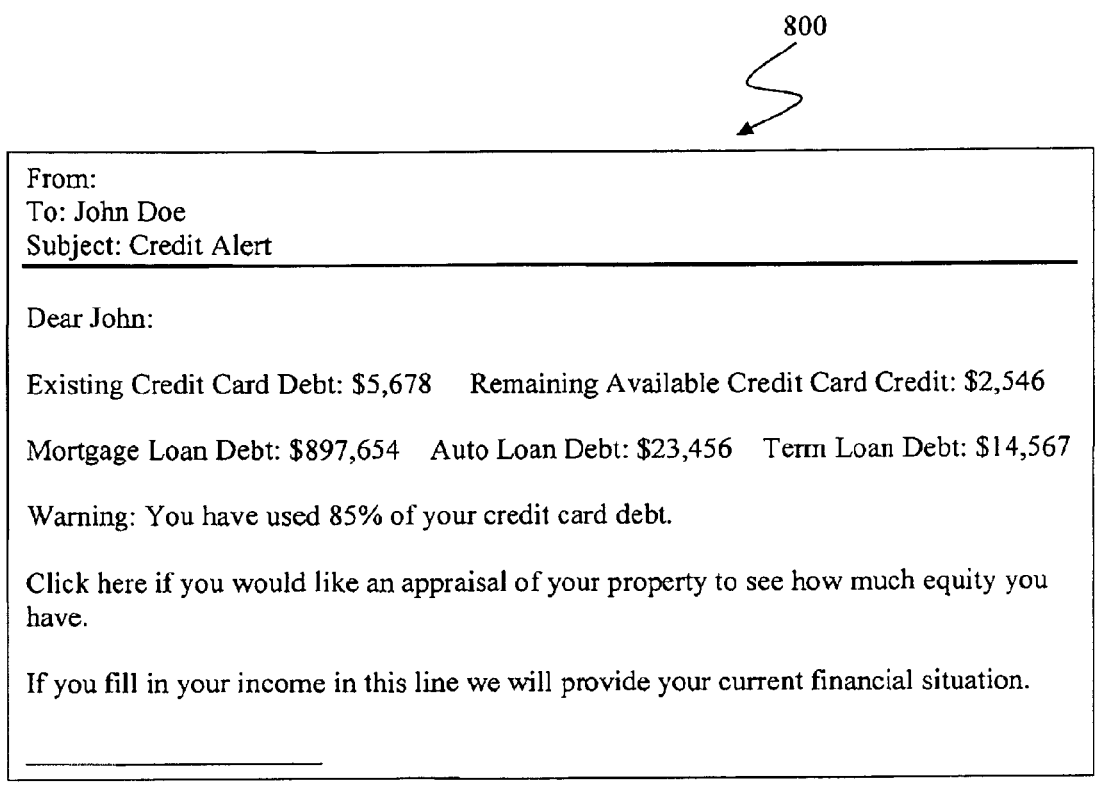
FIG. 8 is an example of an alert email sent by the system.

At step 650, the end user is notified that a migration of credit balance has occurred to the end user's credit. The end user is notified of the migration of credit balance via email. FIG. 8 provides an example of an alert email 800 sent to an end user. As shown in FIG. 8, the email 800 provides the end user the total debt for several debt categories including credit card debt, mortgage debt, auto debt and term loans debt. The email 800 also provides the remaining unused available credit for the credit card debt category and a warning providing a percentage of the total amount of credit card debt that has already been used. The email 800 also provides a hyperlink to access the system 105 in order to provide further personal identity data, in this case, the end user's income to provide the end user an analysis of the end user's current financial situation. The flowchart then proceeds back to step 610.

At step 660, the system 105 determines whether a status time period has passed. The status time period is an amount of time between providing the end user with the current status of the end user's unused available credit information. The status time period is a custom setting that can be modified by the end user. Typically, the status time period is set for one month. If the status time period has passed, the flowchart 600 proceeds to step 670. If the status time period has not passed, the flowchart 600 proceeds back to step 610.

At step 670, the end user is notified of the current status of the end user's unused available credit information. The end user is notified of the current status of the unused available credit information via email and the current status of the total debts owed for each debt category and the total minimum payments due for a given time period for each debt category. The flowchart then proceeds back to step 610.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for on-line monitoring, reporting and summarizing unused available credit, the method comprising:
   providing an on-line computer system that allows an end user to access the system by a computer;
   the system requesting and retrieving credit information of the end user from a credit bureau;
   the system storing the credit information that includes information relating to the total amount of unused available credit for a debt category in a storage database;
   the system presenting the total amount of unused available credit for the debt category to the end user in a graphical or tabular format; and
   the system reconfiguring the credit information for presenting the total amount of unused available credit, wherein reconfiguring the credit information includes:
      the system grouping particular credit information for each credit line into one or more respective debt categories;
      the system determining total amounts of debts owed for respective debt categories;
      the system determining total credit limits allowed for respective debt categories; and
      the system determining total amounts of unused available credit for respective debt categories based on the total amounts of debts owed and the total credit limits allowed for respective debt categories.

2. The method as set forth in claim 1, wherein reconfiguring the credit information further includes determining total minimum payments due for a given time period for respective debt categories.

3. The method as set forth in claim 2, the system presenting the total debts owed for respective debt categories and the total minimum payments due for a given time period for respective debt categories to the end user in a summarized, easily readable and understandable format.

4. The method as set forth in claim 1, further comprising the system periodically updating the total amounts of unused available credit for the respective debt categories.

5. The method as set forth in claim 4, further comprising alerting the end user of a migration of credit balance.

6. The method as set forth in claim 4, further comprising the system periodically notifying the end user of the total amounts of unused available credit for the respective debt categories.

7. The method as set forth in claim 1, wherein the credit information includes information relating to one or more of: revolving credit balances, limits and minimum monthly payments; credit card balances, limits and minimum monthly payments; auto loans, limits and minimum monthly payments; term loans balances, limits and minimum monthly payments; and mortgage and bank lines of credit balances, limits and minimum monthly payments.

8. The method as set forth in claim 1, including the system requesting and retrieving credit information of the end user from the credit bureau via a secure data line.

9. The method as set forth in claim 1, wherein the system is accessible to the end user via the Internet.

10. A system for monitoring, reporting and summarizing unused available credit on-line, the system comprising:
    computer-readable storage having a plurality of executable components stored thereon;
    computer system comprising processing hardware configured to execute instructions in accordance with the plurality of executable components;
    an enrollment component configured to enable an end user to access the system by means of a computer;
    a data request component configured to request and retrieve credit information of the end user from a credit bureau; and
    a data presentation component configured to present total amounts of unused credit available for respective debt categories to the end user in a graphical or tabular format, the data presentation component further configured to:
    group particular credit information for each credit line into one or more debt categories;
    determine total amounts of debts owed for respective debt categories;
    determine total credit limits allowed for respective debt categories; and
    determine the total amounts of unused available credit for respective debt categories based on the total amounts of debts owed for respective debt categories and the total credit limits allowed for respective debt categories; and
    an alert and monitoring component configured to periodically provide the end user with an updated total amount of unused credit available for the debt category and to alert the end user of a migration of credit balance.

11. The system as set forth in claim 10, wherein the data presentation component further presents the total amounts of debt owed for respective debt categories and total minimum payments due for a given time period for respective debt categories.

12. The system as set forth in claim 10, wherein the data request component periodically requests updated credit information from the credit bureau.

13. The system as set forth in claim 10, wherein the credit information includes information relating to one or more of: revolving credit balances, limits and minimum monthly payments; credit card balances, limits and minimum monthly payments; auto loans, limits and minimum monthly payments; term loans balances, limits and minimum monthly payments; and mortgage and bank lines of credit balances, limits and minimum monthly payments.

14. The system as set forth in claim 10, wherein the system requests and retrieves credit information of the end user from the credit bureau via a secure data line.

15. The system as set forth in claim 10, wherein the system is accessible to the end user via the Internet.

16. A non-transitory computer-readable medium comprising instructions that, in response to execution on a system comprising computing hardware, cause the system to perform operations comprising:

receiving a request from an end user to access the system by a computer;

retrieving credit information associated with the end user from a credit bureau;

storing the credit information associated with the end user;

grouping credit line records in the credit information into one or more respective debt categories;

determining total amounts of debts owed for respective debt categories;

determining total credit limits allowed for respective debt categories;

determining total minimum payments due for a given time period for respective debt categories;

determining total amounts of unused available credit for respective debt categories based on the total amounts of debts owed for respective debt categories and the total credit limits allowed for respective debt categories; and presenting, to the user, the total amounts of unused available credit for respective debt categories, the total amounts of debts owed for respective debt categories and the total minimum payments due for a given time period for respective debt categories.

\* \* \* \* \*